April 11, 1950     E. J. GILLESPIE     2,503,666
G SHARP VALVE CONTROL MECHANISM FOR
SAXOPHONES AND THE LIKE
Filed Feb. 23, 1945

INVENTOR.
Earl J. Gillespie,
BY

Patented Apr. 11, 1950

2,503,666

UNITED STATES PATENT OFFICE 2,503,666

G-SHARP VALVE CONTROL MECHANISM FOR SAXOPHONES AND THE LIKE

Earl J. Gillespie, Elkhart, Ind., assignor to The Martin Band Instrument Company, Elkhart, Ind., a corporation of Indiana Application February 23, 1945, Serial No. 579,325

4 Claims. (Cl. 84—385)

1

This invention relates, in general, to musical instruments, and has particular relation to a G sharp valve control mechanism for saxophones and the like.

Prior G sharp mechanisms for saxophones have frequently failed to function properly, due to the tendency of the G sharp valves or pads to catch moisture and to stick. This, of course, interferes with proper operation of the instrument. If the spring for closing the G sharp valve or pad is heavy enough to assure proper closing of the valve, considerable force has been required to open this valve. This makes fingering of the instrument more difficult, and the action of the G sharp valve or pad slow and uncertain. On the other hand, if a weaker spring is employed for closing the G sharp valve or pad, the valve is inclined not to go down or close properly, particularly where moisture has accumulated on or adjacent this valve or pad or the seat therefor.

One of the main objects of the present invention is to provide an improved form of G sharp valve control mechanism and, more particularly, a kicker or booster arrangement which will prevent sticking of the G sharp valve or pad and at the same time assure proper closing of this valve.

Another object of the invention is to provide a valve control mechanism of the class described, and, more particularly, a kicker or booster device which provides quick and certain operation of the valve; also a valve control mechanism or kicker or booster device which enables operation of the key mechanism for this valve with ease and relatively little force, thus facilitating the fingering of the instrument.

Another object of the invention is to provide in conjunction with the G sharp key mechanism, energy storing means presenting minimum resistance to pressure applied to the key in fingering the instrument, and which energy storing means is effective to provide rapid and sure opening of the valve and, at the same time, permits use of a spring of sufficient strength to assure certain and proper closing of the valve.

Another object of the invention is to provide a G sharp valve control mechanism having various features of novelty and advantages, and which is particularly characterized by its simplicity in construction, its economy in manufacture, its effectiveness in use, the ease with which it permits fingering the instrument, and the ability to prevent sticking of the valve and, at the same time, assure proper closing of the valve.

Further objects and advantages of the invention will appear from the following detailed description, taken in connection with the accompanying drawing which illustrates the manner of constructing, assembling, and operating one form of G sharp valve control mechanism embodying the present invention.

Figure 1:
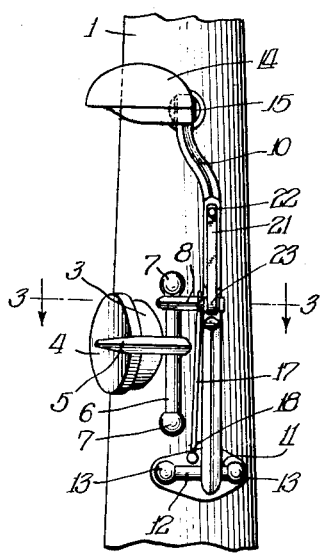
Figure 1 is a fragmentary substantially front elevational view of a portion of a saxophone having a G sharp valve control mechanism embodying the present invention.

Referring now to the drawing, the invention is shown, for purposes of illustration, embodied in a saxophone which comprises a tubular body composed of the longitudinal tubular portion 1 which is preferably tapered. A tubular neck (not shown) is usually provided at the smaller diameter end of the tubular body 1, and a bell or flare (not shown) is usually provided at the opposite end of the tubular body 1.

The tubular portion 1 has a G sharp hole or port 2 which opens through an annular outwardly extending socket or flange 3 upon the outer end of which the G sharp valve or pad 4 is adapted to seat to close the hole 2.

The valve or pad 4 is mounted on an arm 5 carried, for example, by a hinge member or sleeve 6 which is supported for rocking movement by posts 7 secured to and extending outwardly from the tubular body 1. This hinge means is of well known type. The hinge member or sleeve 6 also has an arm 8 which extends laterally therefrom in a direction opposite to the direction of extension of the arm 5.

Figure 2:
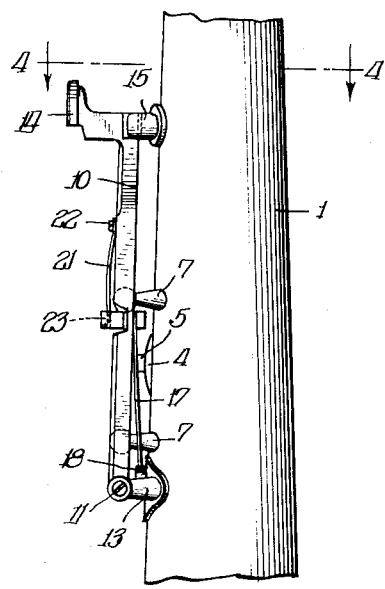
Figure 2 is a fragmentary side elevational view taken at substantially right angles to Figure 1.
Figure 3:
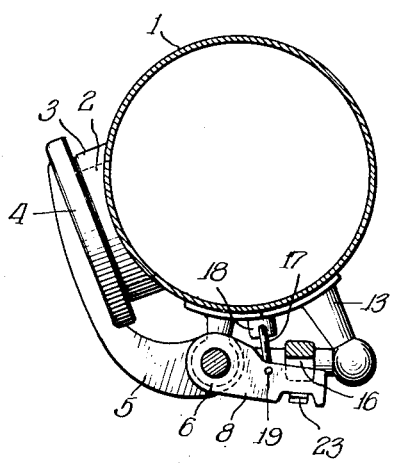
Figure 3 is a cross section taken on the line 3—3 of Figure 1 and looking in the direction of the arrows.
Figure 4:
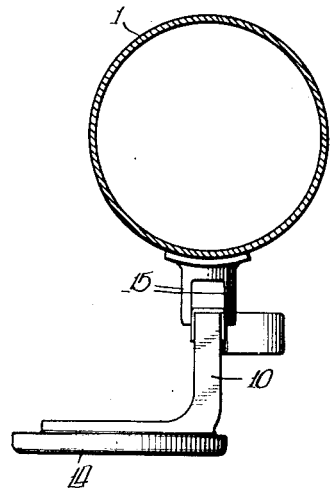
Figure 4 is a cross section taken on the line 4—4 of Figure 2 and looking in the direction of the arrows.

The G sharp lever 10, which is relatively long, is pivoted at 11 to the tubular body 1, for example, upon a hinge member or sleeve 12 supported by posts 13 secured to and extending from the body 1. The lever 10 extends in a generally longitudinal direction along the tubular body 1 and has, at its upper end, a G sharp key or finger piece 14 for swinging the lever in a clockwise direction (Figure 2) by pressure on the key 14. The upper end of the lever 10 is preferably guided by suitable guide means 15 secured to and extending from the body 1. The lever 10 underlies the arm 8 and has a notch or indentation 16 in which the adjacent end of the arm 8 is disposed.

A spring 17, secured at its lower end at 18 to the body 1, is engaged at its upper end at 19 with the arm 8 and constrains the G sharp valve 4 to closed position. This spring 17 may be relatively strong or heavy to assure proper closing of the valve 4, notwithstanding accumulation of moisture or the like on or adjacent this valve or its seat.

A leaf spring 21 is secured at 22 to the outer side of the lever 10 and extends downwardly from the place where it is attached to the lever. The lower free end of the spring 21 overlies and engages the adjacent end of the arm 8, at 23, and is adapted, upon actuation of the key 14 by applying the finger thereto to swing the lever 10 in a clockwise direction (Figure 2) about its pivot 11, to actuate the valve 4 to open position.

The spring 21 constitutes energy storing means which presents minimum resistance to actuation of the key 14 at the initiation of such actuation, and is effective to open the valve 4 when the energy stored in the spring 21 becomes sufficient to overcome the force with which the valve 4 is constrained to closed position by the spring 17. By presenting minimum resistance to actuation of the key 14 at the initiation of such actuation, the present invention provides a valve control mechanism which is adapted for operation easily and with relatively little initial force, thus facilitating the fingering of the instrument. At the same time, when sufficient energy is thus stored in the spring 21 this spring is effective to provide a quick and certain opening of the valve, and, at the same time, permits use of a spring 17 of sufficient strength to assure certain and proper closing of the valve.

In other words, the spring 17 for constraining the G-sharp vent pad to closed position is a relatively strong spring to assure proper closing of the vent pad, whereas the spring 21 is a weaker spring and the actuating key is operable in its initial actuation to tension the spring 21 and thereafter to open the G-sharp vent pad against the constraining action of the first spring and through the spring 21 when the tension in said spring 21 exceeds the constraining action of the spring 17. This eliminates the necessity for a great initial force on the actuating key in opening the G-sharp vent pad, and thus facilitates the fingering of the instrument.

The spring or energy storing means 21 thus serves as a kicker or booster device which is operable to open the G sharp valve, notwithstanding the use of a relatively strong spring for holding this valve closed. The device is simple in construction, economical in manufacture and assembly, and is effective in use in permitting fingering of the instrument with ease and preventing sticking of the valve 4, and, at the same time, with the G sharp valve control mechanism of the present invention, proper closing of the valve 4 may be assured. I contemplate within the scope of the present invention omitting the spring 17 and making other provision for constraining the valve 4 to closed position.

The embodiment of the invention shown in the drawing is for illustrative purposes only, and it is to be expressly understood that said drawing and the accompanying specification are not to be construed as a definition of the limits or scope of the invention, reference being had to the appended claims for that purpose.

I claim:

1. In a saxophone, in combination, a tubular wall structure provided with a G sharp port having a surrounding seat, a G sharp actuating lever pivoted at one end to said wall structure and extending longitudinally thereof, a finger piece on the opposite end of said lever, a hinge sleeve supported at opposite ends on said wall structure for turning movement about its axis and disposed in parallel spaced relation to said lever, a first arm carried by said hinge sleeve and projecting laterally from one side of said sleeve, a G sharp valve pad carried on the outer end of said arm and movable into and out of cooperation with the seat surrounding the G sharp port to close and open said port, a second arm carried by said hinge sleeve, said second arm projecting laterally from the opposite end of said sleeve and having its outer end overlying said G sharp actuating lever, a first spring secured at one end to said wall structure and engaged at its opposite end with said second arm to constrain the G sharp valve pad to closed position, and a second spring weaker than said first spring overlying and engaging at one end the adjacent end of said second arm, said second spring extending longitudinally along said G sharp actuating lever toward the finger piece thereon and secured at its opposite end to said lever.

2. A G sharp valve pad actuating mechanism for saxophones according to claim 1, wherein the free end of said second arm overlies the G sharp actuating lever substantially intermediate the ends thereof, and wherein the G sharp actuating lever is notched where said second arm overlies the same to receive said second arm.

3. A G sharp valve pad actuating mechanism for saxophones according to claim 1, wherein the free end of said second arm overlies the G sharp actuating lever substantially intermediate the ends thereof and wherein the first spring is secured to the wall structure adjacent to the place where the G sharp actuating lever is pivoted to the wall structure.

4. A G sharp valve pad actuating mechanism for saxophones according to claim 1, wherein the free end of said second arm overlies the G sharp actuating lever substantially intermediate the ends thereof and wherein the first spring is secured to the wall structure adjacent to the place where the G sharp actuating lever is pivoted to the wall structure, said G sharp actuating lever being notched where said second arm overlies the same to receive said second arm.

EARL J. GILLESPIE.

REFERENCES CITED

The following references are of record in the file of this patent:

UNITED STATES PATENTS

| Number | Name | Date |
|---|---|---|
| 1,620,564 | McElroy | Mar. 8, 1927 |
| 1,683,219 | Waters | Sept. 4, 1928 |
| 1,735,411 | Powell | Nov. 12, 1929 |
| 1,983,183 | Newell et al. | Dec. 4, 1934 |
| 2,112,363 | Gotthardt | Mar. 29, 1938 |
| 2,163,352 | Powell | June 20, 1939 |
| 2,182,198 | Christensen | Dec. 5, 1939 |